W. R. & W. H. MAUL.
STEERING SLED.
APPLICATION FILED APR. 17, 1912.
1,052,734.
Patented Feb. 11, 1913.
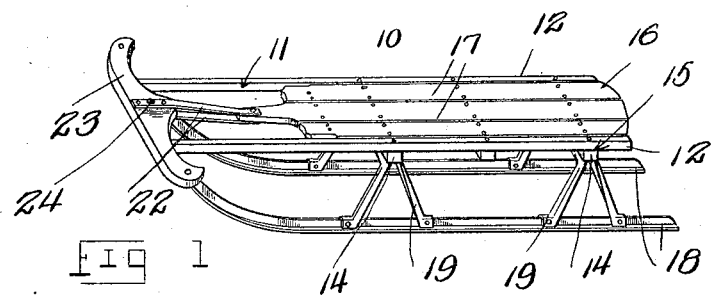
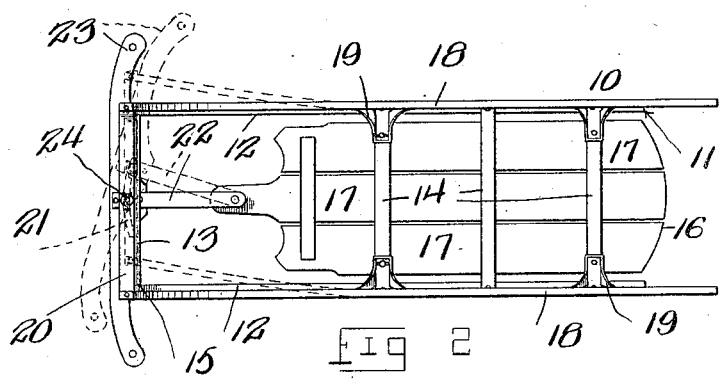
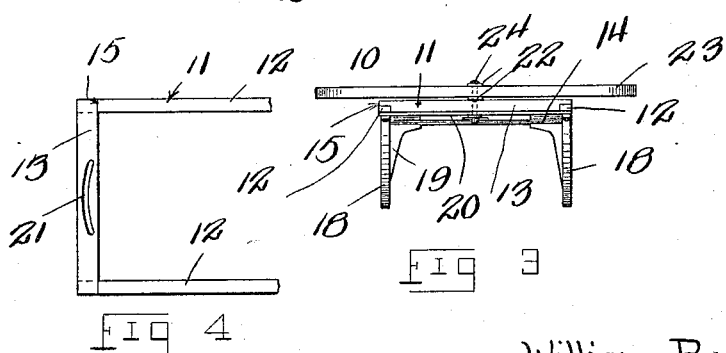
INVENTORS
William R. Maul,
William H. Maul,
WITNESSES
BY
ATTORNEY

UNITED STATES PATENT OFFICE.

WILLIAM R. MAUL AND WILLIAM H. MAUL, OF YORK, PENNSYLVANIA.

STEERING-SLED.

1,052,734. Specification of Letters Patent. Patented Feb. 11, 1913.

Application filed April 17, 1912. Serial No. 691,395.

*To all whom it may concern:*

Be it known that we, WILLIAM R. MAUL and WILLIAM H. MAUL, citizens of the United States, residing at York, in the county of York and State of Pennsylvania, have invented certain new and useful Improvements in Steering-Sleds, of which the following is a specification, reference being had therein to the accompanying drawing.

This invention relates to new and useful improvements in sleds, and more especially to that class adapted to be used by children, and termed "steering sleds."

An object of this invention is the provision of a sled, such as described, which employs the use of a steering bar, which is so constructed and connected to the remainder of the sled, that upon movement thereof in either direction, the runners will be simultaneously moved at their forward ends either to the right or to the left, thereby steering the sled.

A further object of this invention is to improve and simplify devices of this character, rendering them comparatively simple and inexpensive to manufacture, reliable and efficient in use, and readily operated.

With the above and other objects in view, this invention resides in the novel features of construction, formations, combinations and arrangements of parts to be hereinafter more fully described, claimed and illustrated in the accompanying drawings in which:—

Figure 1, is a perspective view of our invention. Fig. 2, is a bottom plan view thereof. Fig. 3, is a front elevation thereof. Fig. 4, is a top plan view of a portion of the frame.

Referring to the accompanying drawings by similar characters of reference throughout the several views, the numeral 10, designates generally our improved sled, which consists of a main frame 11, comprising opposite side bars 12, connected at their forward ends by a front transverse bar 13, and at points throughout their lengths, by intermediate transverse bars 14. These bars 12, 13, and 14, are firmly secured in any suitable manner to produce a rigid frame 15, to which is secured the usual seat 16, formed from longitudinally connected slats 17.

The runners 18, are connected to the frame 15, at points substantially intermediate their ends, and at points adjacent their rear ends by the usual braces 19; while the upwardly curved free ends of these said runners are connected by a cross bar 20, disposed below the bar 13, which is formed with a centrally located curved orifice 21, struck on an arc having its central point disposed upon the forward end of the central slat 17, of the seat 16, at which point is pivotally connected to the said seat, a pair of straps 22, which have secured rigidly to their forward ends, a steering bar 23, the same being in the form of a foot rest or brace.

As clearly shown in the drawings, the members 13, 20, and 23, are arranged in superimposed relation to each other, and passing through these said members is a bolt 24. This said bolt is rigidly retained within the steering bar 23, and cross bar 20, at its opposite ends; while the intermediate portion thereof is disposed within the orifice 21, which upon the movement of the steering bar 23, causes the runners 18, to be flexed in either direction, thereby making possible the ready and convenient steering of the sled. It should be understood in this connection, that various minor changes in the details of construction can be resorted to within the scope of the appended claim without departing from or sacrificing any of the advantages of the invention.

From the foregoing disclosures taken in connection with the accompanying drawing, it will be manifest that a sled is provided, which will fulfil all of the necessary requirements of such a device.

Having thus fully described this invention, what we claim as new, and desire to protect by Letters Patent is:—

The combination in a sled, of a frame, a bar connected to the forward portion of the frame, runners connected to the frame and having forward free ends, a bar connecting the free ends of the runners, said last mentioned bar being disposed beneath the first mentioned bar, a seat secured to the frame, straps pivoted to the seat, a steering bar secured to the straps, and arranged above the other bars with its forward edge in advance of the forward edges of the first vertical bars, a connecting member secured to the steering bar and runner connecting bar, and the other of the said bars having an orifice formed therein for receiving the connecting members whereby the seat will be braced when pressure is exerted on the forward end thereof, and the seat strengthened.

In testimony whereof we affix our signatures in presence of two witnesses.

WILLIAM R. MAUL.
WILLIAM H. MAUL.

Witnesses:
A. M. OWEN,
GRACE WEISZ.

Copies of this patent may be obtained for five cents each, by addressing the "Commissioner of Patents, Washington, D. C."